(12) United States Patent
Lee et al.

(10) Patent No.: US 8,010,212 B2
(45) Date of Patent: Aug. 30, 2011

(54) FUZZY CONTROL METHOD FOR ADJUSTING A SEMICONDUCTOR MACHINE

(75) Inventors: Yi Feng Lee, Taoyuan County (TW); Tzu-Cheng Lin, Taipei (TW); Chun Chi Chen, Taipei (TW); Yun-Zong Tian, Taichung County (TW)

(73) Assignee: Inotera Memories, Inc., Taoyuan County (TW)

( * ) Notice: Subject to any disclaimer, the term of this patent is extended or adjusted under 35 U.S.C. 154(b) by 388 days.

(21) Appl. No.: 12/241,568

(22) Filed: Sep. 30, 2008

(65) Prior Publication Data
US 2009/0259332 A1 Oct. 15, 2009

(30) Foreign Application Priority Data
Apr. 9, 2008 (TW) .............................. 97112773 A

(51) Int. Cl.
G05B 13/02 (2006.01)
(52) U.S. Cl. .............................. 700/50; 700/28; 706/904
(58) Field of Classification Search .................. 700/110, 700/109, 117, 121, 51, 53, 50, 28–33, 44–48; 706/900, 3, 4, 9, 23, 904
See application file for complete search history.

(56) References Cited

U.S. PATENT DOCUMENTS

| | | | | |
|---|---|---|---|---|
| 5,428,379 A * | 6/1995 | Kaneko et al. ................ | 706/900 |
| 5,467,883 A * | 11/1995 | Frye et al. ....................... | 700/44 |
| 5,497,331 A * | 3/1996 | Iriki et al. ..................... | 706/900 |
| 5,544,256 A * | 8/1996 | Brecher et al. ................ | 706/900 |
| 5,579,438 A * | 11/1996 | Kaneko et al. ................ | 706/900 |
| 5,606,620 A * | 2/1997 | Weinfurtner .................. | 381/314 |
| 5,606,646 A * | 2/1997 | Khan et al. ..................... | 706/30 |
| 5,737,496 A * | 4/1998 | Frye et al. ..................... | 706/906 |
| 5,835,681 A * | 11/1998 | Kaneko et al. ................ | 706/900 |
| 6,097,495 A * | 8/2000 | Uzawa et al. .................. | 356/401 |
| 6,298,470 B1 * | 10/2001 | Breiner et al. ................ | 700/109 |
| 6,333,786 B1 * | 12/2001 | Uzawa et al. .................. | 700/121 |
| 6,477,432 B1 * | 11/2002 | Chen et al. ..................... | 700/51 |
| 6,526,547 B2 * | 2/2003 | Breiner et al. ................ | 716/56 |
| 6,532,392 B1 * | 3/2003 | Eryurek et al. ................ | 700/54 |
| 6,539,267 B1 * | 3/2003 | Eryurek et al. ................ | 700/51 |
| 6,556,876 B1 * | 4/2003 | Prosack et al. ................ | 700/50 |
| 6,627,464 B2 * | 9/2003 | Coumou .......................... | 438/9 |
| 6,640,151 B1 * | 10/2003 | Somekh et al. ............... | 700/121 |
| 6,693,985 B2 * | 2/2004 | Li et al. ......................... | 375/355 |
| 6,739,947 B1 * | 5/2004 | Molnar ........................... | 451/8 |
| 6,901,317 B2 * | 5/2005 | Starner .......................... | 700/121 |
| 6,986,698 B1 * | 1/2006 | Molnar ........................... | 451/5 |
| 7,008,300 B1 * | 3/2006 | Molnar .......................... | 700/121 |
| 7,131,890 B1 * | 11/2006 | Molnar ........................... | 451/8 |
| 7,156,717 B2 * | 1/2007 | Molnar ........................... | 451/5 |
| 7,171,897 B2 * | 2/2007 | Barajas et al. ................ | 101/129 |

(Continued)

*Primary Examiner* — Kakali Chaki
*Assistant Examiner* — Kelvin Booker
(74) *Attorney, Agent, or Firm* — Rosenberg, Klein & Lee

(57) ABSTRACT

A method of fuzzy control for adjusting a semiconductor machine comprising: providing measurement values from first the "parameter of a pre-semiconductor manufacturing process", second the "parameter of the semiconductor manufacturing process", and third the "operation parameter of the semiconductor manufacturing process"; performing a fuzzy control to define two inputs and one output corresponding to the measurement values, wherein the difference between the first and third values, and the difference between the second and third values, forms the two inputs, then from the two inputs one target output is calculated by fuzzy inference; finally, determining if the target output is in or out of an acceptable range. Whereby the target output is the "machine control parameter of the semiconductor manufacturing process" and when within an acceptable range is used for adjusting the semiconductor machine.

22 Claims, 6 Drawing Sheets

U.S. PATENT DOCUMENTS

| | | | |
|---|---|---|---|
| 7,220,164 B1 * | 5/2007 | Molnar | 451/8 |
| 7,225,047 B2 * | 5/2007 | Al-Bayati et al. | 700/121 |
| 7,337,019 B2 * | 2/2008 | Reiss et al. | 700/21 |
| 7,377,836 B1 * | 5/2008 | Molnar | 451/5 |
| 7,493,185 B2 * | 2/2009 | Cheng et al. | 700/51 |
| 7,572,169 B1 * | 8/2009 | Molnar | 451/8 |
| 7,580,768 B2 * | 8/2009 | Muenz | 700/109 |
| 7,636,611 B2 * | 12/2009 | Huandra | 700/121 |
| 7,805,279 B2 * | 9/2010 | Ogushi et al. | 700/110 |
| 2008/0057830 A1 * | 3/2008 | Molnar | 451/5 |
| 2008/0306624 A1 * | 12/2008 | Molnar | 700/121 |
| 2010/0205127 A1 * | 8/2010 | Chen et al. | 706/13 |

* cited by examiner

FUZZY CONTROL METHOD FOR ADJUSTING A SEMICONDUCTOR MACHINE

BACKGROUND OF THE INVENTION

1. Field of the Invention

The present invention relates to a fuzzy control method for adjusting a semiconductor machine. In particular, the present invention relates to a fuzzy control method for adjusting a semiconductor machine by utilizing fuzzy control to adjust the control parameters of the semiconductor machine in the semiconductor manufacturing process.

2. Description of Related Art

The semiconductor manufacturing process is a core manufacturing process for the electronic, communication, optical-electrical and solar energy products, and is the basic technology for the wafer foundry. The manufacturing process integration and the quality of the semiconductor manufacturing process has the following trends, including (1) using the control technology to enhance the manufacturing process performance, (2) using the statistics method to monitoring the semiconductor machine performance, and (3) using the semiconductor machine performance to verify the manufacturing process performance. For example, in order to monitor semiconductor machine and reduce the cost and the risk, the semiconductor manufacturer develops the Metrology integration system technology and the automatic real-time monitoring system, such as the advanced process control (APC). The APC can be divided onto the manual experience control, the run-to-run (R2R or RbR), the model-based process control (MBPC), and the fault detection and classification (FDC). The R2R is designed to integrate the semiconductor machine, the manufacturing process operation, the status variations, and the chip measurement quality variations on-line and in real-time, and use the manufacturing process model estimation to feed back and adjust the manufacturing process parameters on-line. The FDC estimates the semiconductor machine failure and the element failure in real time and uses the fault classification technology the find out the failure or the abnormal reason in order to monitor the equipment health condition and achieve the predictive maintenance mechanism. The control chip and the maintenance are thereby reduced.

Please refer to FIG. 1, a conventional method for predicting the manufacturing process parameter variation, and a system, a storage medium thereof is described as follows. The method determines whether at least one manufacturing process parameter changes or not, and includes the following steps. At least one detection machine is used for generating at least one statistical manufacturing process control table (S10). The statistical manufacturing process control table is inputted, at least one detection parameter and at least one manufacturing process parameter corresponding to the statistical manufacturing process control table are defined, and a relationship table between the detection parameters and the manufacturing process parameters is defined (S20). Whether the statistical manufacturing process control table meets a pre-determined condition is checked (S30). When the pre-determined condition is met, a first parameter corresponding to the pre-determined condition is selected from the detection parameters (S40). According to the relationship table, a second parameter corresponding to the first parameter is selected from the manufacturing process parameters (S50). The relative manufacturing process parameter record corresponding to the second parameter is inputted (S60). According to the manufacturing process parameter record, a parameter variation is determined (S70). The parameter variation of the manufacturing process machine is adjusted (S80). Finally, the adjusted manufacturing process parameter is used for manufacturing a semiconductor product (S90).

The prior art focuses on a single manufacturing process machine and uses the yield rate to trace back the obvious and easy manufacturing process parameter variation or change to adjust the manufacturing process parameter of the machine. The accuracy of this method is easily affected by the pre-manufacturing process, or the characteristic of the manufacturing process machine. Therefore, the manufacturing process machine usually is over-controlled or the manufacturing process parameter is extremely adjusted. The reliability is reduced, and the manufacturing cost is expensive.

SUMMARY OF THE INVENTION

One particular aspect of the present invention is to provide a fuzzy control method for adjusting a semiconductor machine that is applied to a semiconductor manufacturing process. The method uses the fuzzy operation to calculate the control parameter of the machine and accurately adjusts the parameter of the machine.

The fuzzy control method for adjusting a semiconductor machine is applied to a semiconductor machine in a semiconductor manufacturing process. The fuzzy control method for adjusting a semiconductor machine includes the following steps. A machine measurement parameter of a pre-semiconductor manufacturing process, a machine measurement parameter of the semiconductor manufacturing process, and a machine operation parameter of the semiconductor manufacturing process are provided. A fuzzy deciding operation is executed, a machine adjusting level of the semiconductor manufacturing process is selected, the difference between the machine measurement parameter of the pre-semiconductor manufacturing process and the machine operation parameter of the semiconductor manufacturing process is defined as a parameter input value, the difference between the machine measurement parameter of the semiconductor manufacturing process and the machine operation parameter of the semiconductor manufacturing process is defined as another parameter input value, and a machine control parameter of the semiconductor manufacturing process is calculated. Whether the machine control parameter of the semiconductor manufacturing process surpasses an acceptable range is determined. When the machine control parameter of the semiconductor manufacturing process surpasses the acceptable range, the above steps are repeated. When the machine control parameter of the semiconductor manufacturing process does not surpass the acceptable range, the machine control parameter of the semiconductor manufacturing process is used for adjusting the machine.

The present invention has the following characteristics:

1. The quantity of the chips damaged in the semiconductor manufacturing process or by the abnormal machine control parameter is reduced when the method has been applied.

2. The machine control parameter obtained from the fuzzy control can reduce the error caused by the manual machine adjustment parameter so that the machine can operate normally and the yield rate is increased.

3. By monitoring the manufacturing process and the machines in real time, the prediction maintenance is achieved. The unnecessary maintenance is reduced. The utility rate of the machine is increased, the operation efficiency of the operator is enhanced, and the cost of the backup materials is reduced.

4. The danger caused by the abnormal manufacturing process and the machines is reduced to achieve the prediction safety goal.

For further understanding of the present invention, reference is made to the following detailed description illustrating the embodiments and examples of the present invention. The description is for illustrative purpose only and is not intended to limit the scope of the claim.

BRIEF DESCRIPTION OF THE DRAWINGS

The drawings included herein provide a further understanding of the present invention. A brief introduction of the drawings is as follows.

DETAILED DESCRIPTION OF PREFERRED EMBODIMENTS

Figure 1:
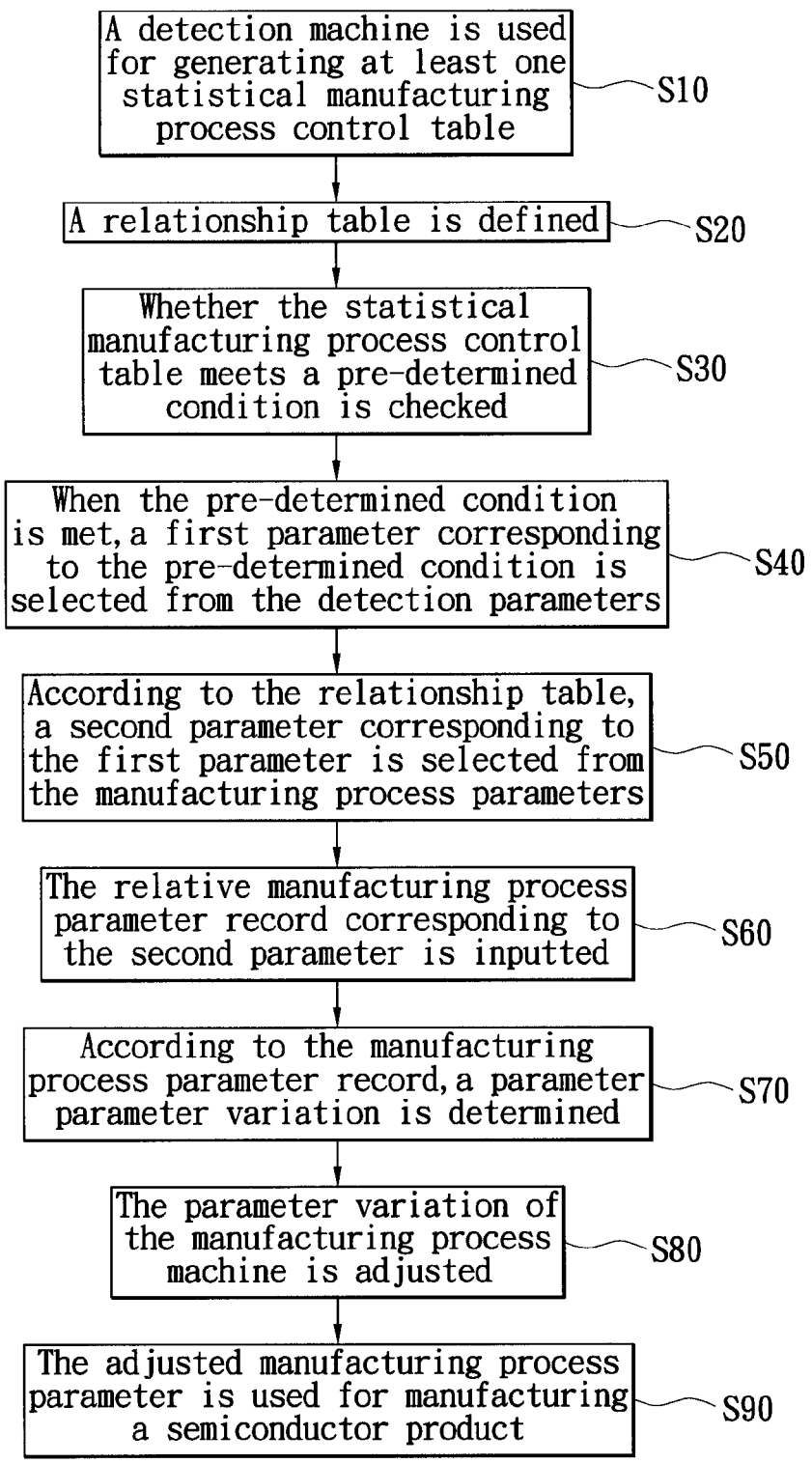
FIG. 1 is flow chart of the method for predicting the manufacturing process parameter variation of the prior art.
Figure 2:
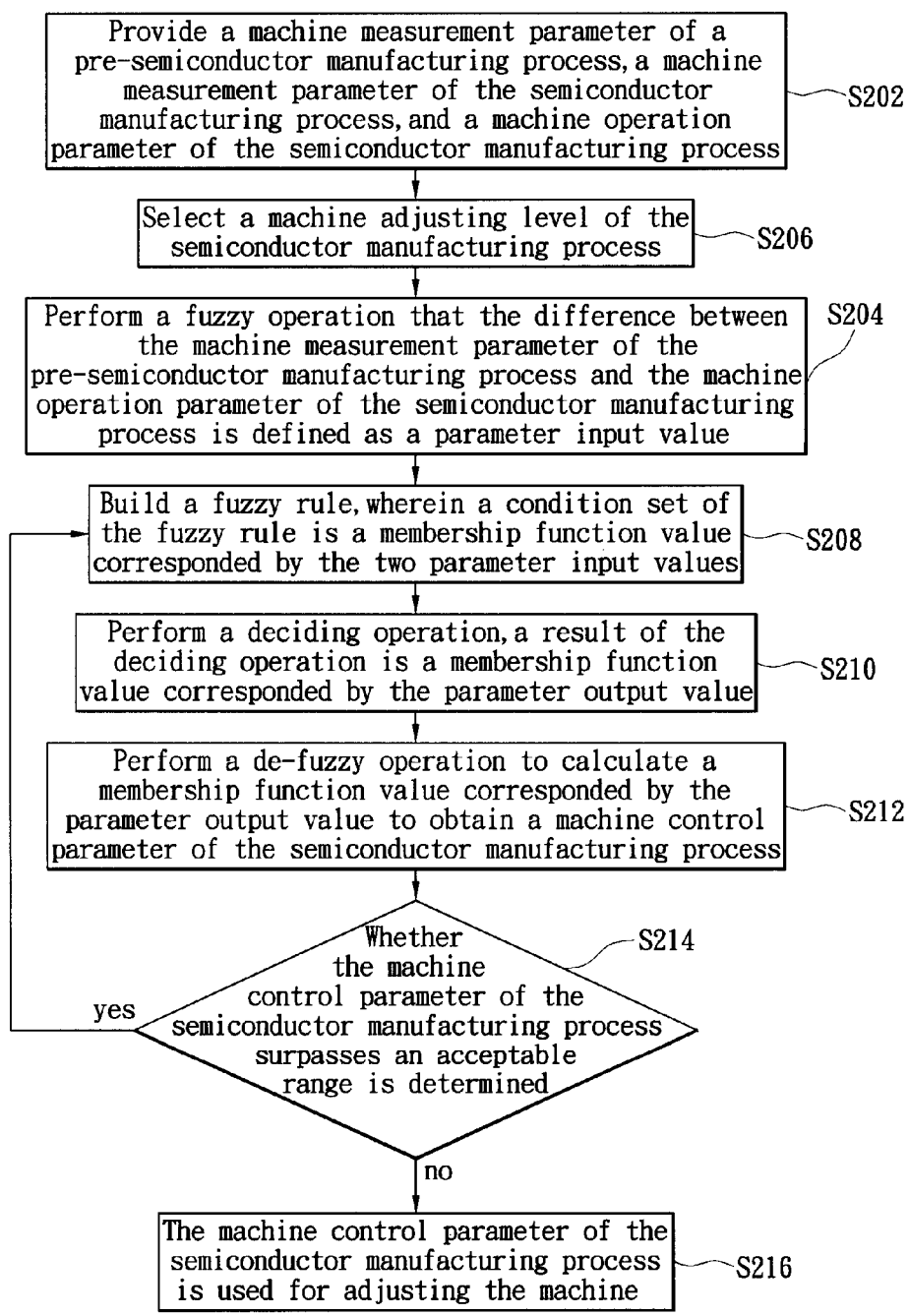
FIG. 2 is flow chart of the fuzzy control method for adjusting a semiconductor machine of the present invention.

Reference is made to FIG. 2, which shows the fuzzy control method S200 for adjusting a semiconductor machine of the present invention. The method is applied to a semiconductor manufacturing process for adjusting the machine control parameter. The fuzzy control method S200 for adjusting a semiconductor machine includes step S202, step S204, step S206, step S208, step S210, step S212, step S214, and step S216.

Figure 3:
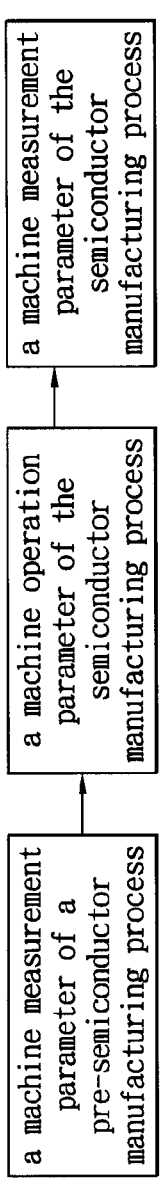
FIG. 3 is functional block of the fuzzy control method for adjusting a semiconductor machine of the present invention.

The step S202 is executed. A machine measurement parameter of a pre-semiconductor manufacturing process, a machine measurement parameter of the semiconductor manufacturing process, and a machine operation parameter of the semiconductor manufacturing process are provided. Reference is made to FIG. 3. The machine measurement parameter of the pre-semiconductor manufacturing process, the machine measurement parameter of the semiconductor manufacturing process, and the machine operation parameter of the semiconductor manufacturing process are used for building the parameter history data of the pre-semiconductor manufacturing process and the semiconductor manufacturing process and are recorded as a train data. In this embodiment, there are 10 parameter history data. The pre-semiconductor manufacturing process and the semiconductor manufacturing process can be a wafer cleaning process, a photo process, a coating process, or an etching process. The machine measurement parameter and the machine operation parameter can be the wafer cleaning parameter, the exposure parameter, the coating parameter, or the etching parameter.

Figure 4:
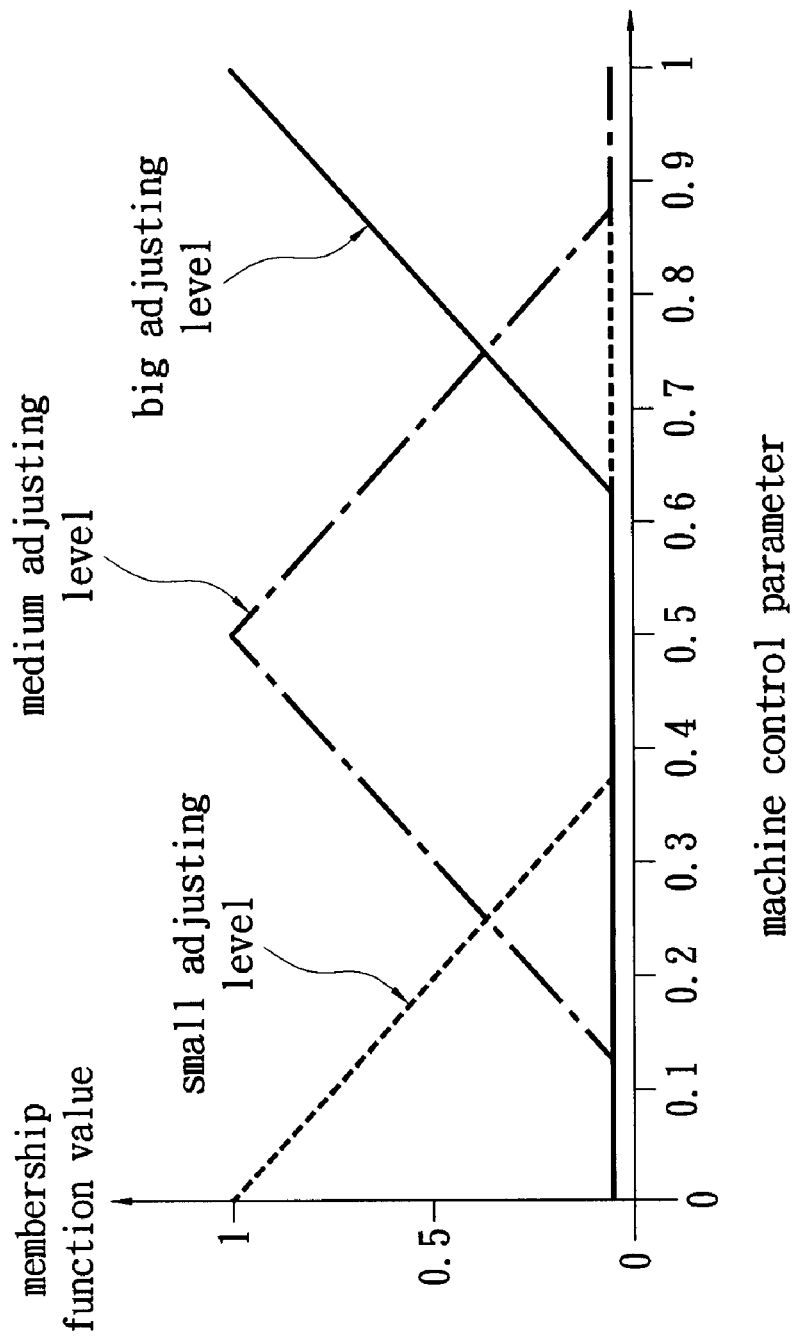
FIG. 4 is a membership function diagram of the parameter output of the fuzzy control method for adjusting a semiconductor machine of the present invention.

The step S204 is executed. A machine adjusting level of the semiconductor manufacturing process is selected. The machine adjusting level is divided into a small adjusting level, a medium adjusting level, and a big adjusting level. Reference is made to FIG. 4. The membership function corresponded by the machine adjusting level is defined as a mathematical set and is expressed as below.

$$MF_{Degree} = \{-\tfrac{3}{8}MAX(Input_{Variation}), 0, \tfrac{3}{8}MAX(Input_{Variation})\}$$

MF is the membership function, Degree includes the small adjusting level, the medium adjusting level and the big adjusting level, MAX is the maximum function, and $Input_{Variation}$ is an input value and is the independent variable of the membership function. The user determines the adjusting level of the membership function.

The step S206 is executed. A fuzzy operation is executed. According to the parameter history data of the pre-semiconductor manufacturing process and the semiconductor manufacturing process, such as the train data, the difference between the machine measurement parameter of the pre-semiconductor manufacturing process and the machine operation parameter of the semiconductor manufacturing process is defined as a parameter input value, the difference between the machine measurement parameter of the semiconductor manufacturing process and the machine operation parameter of the semiconductor manufacturing process is defined as another parameter input value, a parameter output value is defined, a membership function value corresponded by the two parameter input values and the parameter output value is defined. The membership function value is a triangle-type membership function value. The mathematical formula of the parameter input value is expressed as below.

$$FF_{Variation} = (FF_{Target} - FF_t)/FF_{Target}$$

$(FF_{Target} - FF_t)/FF_{Target}$ is a normalization difference value of the machine measurement parameter of the pre-semiconductor manufacturing process and the machine operation parameter of the semiconductor manufacturing process, and is labeled as $FF_{Variation}$. Another parameter input value is expressed as below.

$$FB_{Variation} = (FB_{Target} - FB_t)/FB_{Target}$$

$(FB_{Target} - FB_t)/FB_{Target}$ is the a normalization difference value of the machine measurement parameter of the semiconductor manufacturing process and the machine operation parameter of the semiconductor manufacturing process, and is labeled as $FB_{Variation}$. The parameter output value is expressed as below.

$$Recipe_{variation} = Fuzzy\_Tune(FF_{variation}, FB_{variation})$$

Fuzzy_Tune is a fuzzy operation function. $FF_{Variation}$ and $FB_{Variation}$ are the independent variables of the fuzzy operation function. The dependent variable of the fuzzy operation function is labeled as $Recipe_{variation}$.

The step S208 is executed. A fuzzy rule is built. The fuzzy rule is an IF-THEN type. The condition set of the fuzzy rule is the membership function value corresponded by the two parameter input values. In this embodiment, the fuzzy rule is:

IF $FF_{Variation}$=Small AND $FB_{Variation}$=Small THEN $Recipe_{Variation}$=Small IF $FF_{Variation}$=Small AND $FB_{Variation}$=Medium THEN $Recipe_{Variation}$=Medium IF $FF_{Variation}$=Small AND $FB_{Variation}$=Big THEN $Recipe_{Variation}$=Big $FF_{Variation}$ and $FB_{Variation}$ are the two parameter input values. $Recipe_{Variation}$ is the parameter output value. Small, Medium, and Big are the adjusting level of the membership function. From the fuzzy rule described by IF-THEN, when the two parameter input values meet the IF condition, the parameter output value is the output value described by THEN.

The step S210 is executed. A deciding operation is performed. The result of the deciding operation is the membership function value corresponded by the parameter output values.

Figure 5:
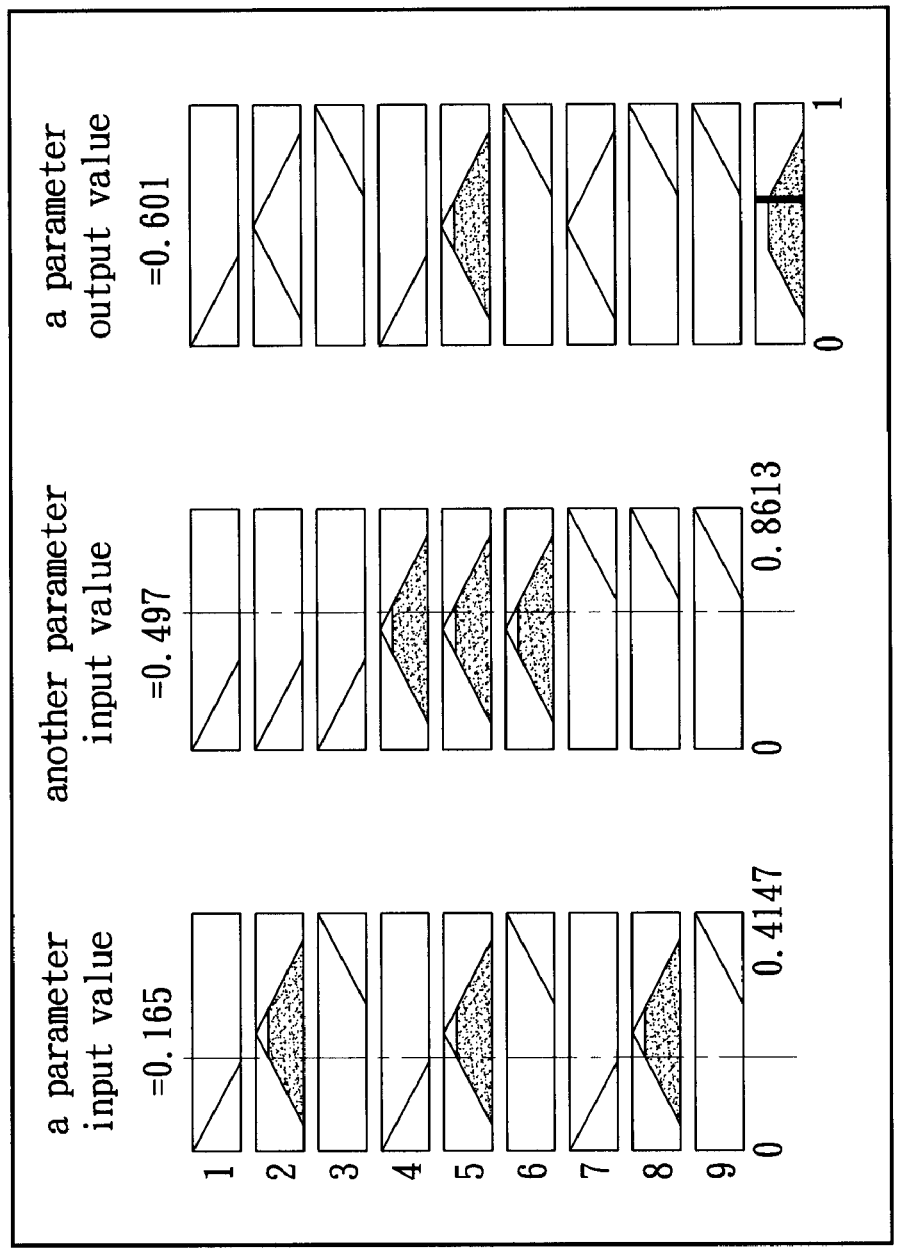
FIG. 5 is a membership function diagram of the parameter output and the output of the fuzzy control method for adjusting a semiconductor machine of the present invention.

The step S212 is executed. A de-fuzzy operation is performed. The de-fuzzy operation is an area method, a gravity center method, or a height method. In this embodiment, the area method is used for calculating the membership function value corresponded by the parameter output values, (reference is made to FIG. 5) and a machine control parameter of the semiconductor manufacturing process is obtained. The machine control parameter of the semiconductor manufacturing process is the parameter output value.

The step S214 is executed. Whether the machine control parameter of the semiconductor manufacturing process surpasses the acceptable value is determined. When the machine control parameter of the semiconductor manufacturing process surpasses the acceptable value, the step S208 is repeated. When the machine control parameter of the semiconductor manufacturing process does not surpass the acceptable value, a next step is performed.

The step S216 is executed. The machine control parameter of the semiconductor manufacturing process is inputted into the machine of the semiconductor manufacturing process to adjust the machine.

According to the table 1 below, three methods (including the manual experience control, the R2R control, and the fuzzy control of the present invention) are used for adjusting the machine control parameter. The process capability ($C_{PK}$) and the root mean square error (RMSE) are used to evaluate the performance of the three methods. The higher the $C_{PK}$, the higher the performance would be. Also, the lower the RMSE, the higher the performance would be. Comparing to the R2R control and the manual experience control, the $C_{PK}$ of the fuzzy control of the present invention is larger than both by respectively 415.7% and 113.4%, and the RMSE of the fuzzy control of the present invention is lower than both by respectively 75.6% and 8%.

TABLE 1

Manufacturing process machine

| method | manual experience control | R2R control | fuzzy control |
|---|---|---|---|
| $C_{PK}$ | 2.4289 | 8.9032 | 10.096 |
| RMSE | 0.0015822 | 0.00041839 | 0.00038631 |

Figure 6:
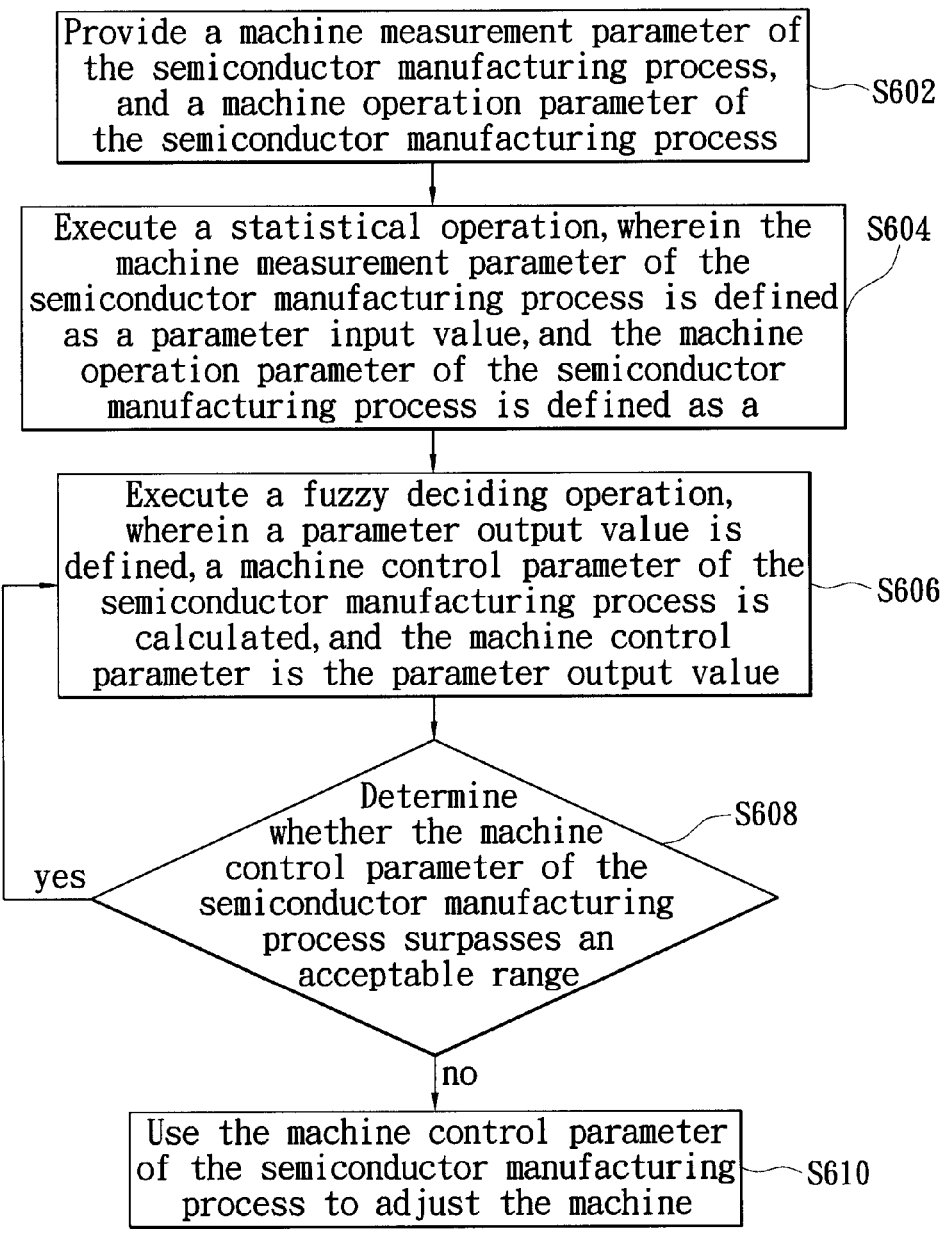
FIG. 6 is a flow chart of the fuzzy control method for adjusting a semiconductor machine of the second embodiment of the present invention.

Reference is made to FIG. 6, which shows the flow chart of the fuzzy control method S600 for adjusting a semiconductor machine of the second embodiment of the present invention. The fuzzy control method S600 for adjusting a semiconductor machine is applied to a semiconductor manufacturing process for adjusting a machine control parameter. The fuzzy control method S600 for adjusting a semiconductor machine includes the following steps of S602, S604, S606, S608, and S610.

Step S602 is executed. A machine measurement parameter of the semiconductor manufacturing process and a machine operation parameter of the semiconductor manufacturing process are provided.

Step S604 is executed, in other words, a statistical operation is executed. The machine measurement parameter of the semiconductor manufacturing process is defined as a parameter input value. The machine operation parameter of the semiconductor manufacturing process is defined as another parameter input value. The statistical operation includes the following steps: including performing a fault detection and classification, and performing a statistical weight.

The fault detection and classification is used for classifying the machine measurement parameter of the semiconductor manufacturing process to generate a related machine measurement parameter of the semiconductor manufacturing process, and for classifying the machine operation parameter of the semiconductor manufacturing process to generate a related machine operation parameter of the semiconductor manufacturing process.

The statistical weight is used for weighting the related machine measurement parameter of the semiconductor manufacturing process to generate a parameter input value, and for weighting the related machine operation parameter of the semiconductor manufacturing process to generate another parameter input value. For example, the engineer uses different weight parameters according to the experience of the semiconductor manufacturing process to multiply with the related machine measurement parameter of the semiconductor manufacturing process and also to multiply with the related machine operation parameter of the semiconductor manufacturing process in order to generate the two parameter input values. The weight parameter is between 0.1 and 1.

Step S606 is executed. The two parameter input values are operated with a fuzzy deciding operation. A parameter output value is defined. A machine control parameter of the semiconductor manufacturing process is calculated. The machine control parameter is the parameter output value.

Step S608 is executed. Whether the machine control parameter of the semiconductor manufacturing process surpasses the acceptable value or not is determined. When the machine control parameter of the semiconductor manufacturing process surpasses the acceptable range, the above step (i.e. S606) is repeated. When the machine control parameter of the semiconductor manufacturing process does not surpass the acceptable value, a next step (i.e. S610) is executed. For example, the machine control parameter of the semiconductor manufacturing process can show the trend of increasing or decreasing with the acceptable range. When the machine control parameter of the semiconductor manufacturing process approaches the upper limit or the lower limit of the acceptable range, the engineer can determine the equipment health condition of the semiconductor machine of the semiconductor manufacturing process and provides a method to prevent the semiconductor machine from becoming worse.

Step S610 is executed. The machine control parameter of the semiconductor manufacturing process is used to adjust the machine. For example, when the machine control parameter of the semiconductor manufacturing process surpasses the upper limit or the lower limit of the acceptable range, then the engineer judges that the equipment health condition of the semiconductor machine of the semiconductor manufacturing process is abnormal, and adjusts accordingly.

The present invention uses the fuzzy control to adjust the machine. Comparing to the prior art, the present invention has the following characteristics:

1. The quantity of the chips damaged in the semiconductor manufacturing process or by the abnormal machine control parameter is reduced when the method has been applied.

2. The machine control parameter obtained from the fuzzy control can reduce the error caused by the manual machine adjustment parameter so that the machine can operate normally and the yield rate is increased.

3. By monitoring the manufacturing process and the machines in real time, the prediction maintenance is achieved. The unnecessary maintenance is reduced. The utility rate of the machine is increased, the operation efficiency of the operator is enhanced, and the cost of the backup materials is reduced.

4. The variation of the machine control parameter is reduced, the $C_{pk}$ is improved, and the quality is improved.

5. The danger caused by the abnormal manufacturing process and the machines is reduced to achieve the prediction safety goal.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A fuzzy control method for adjusting a semiconductor machine, applied to the semiconductor machine in a semiconductor manufacturing process, the method comprising:

providing a machine measurement parameter of a pre-semiconductor manufacturing process, a machine measurement parameter of the semiconductor manufacturing process, and a machine operation parameter of the semiconductor manufacturing process;

determining a difference between the machine measurement parameter of the pre-semiconductor manufacturing process and the machine operation parameter, and determining another difference between the machine measurement parameter of the semiconductor manufacturing process and the machine operation parameter of the semiconductor manufacturing process;

executing a fuzzy deciding operation on basis of a first parameter input value and a second parameter input value, and selecting a machine adjusting level of the semiconductor manufacturing process accordingly, wherein the difference between the machine measurement parameter of the pre-semiconductor manufacturing process and the machine operation parameter of the semiconductor manufacturing process is defined as the first parameter input value, the difference between the machine measurement parameter of the semiconductor manufacturing process and the machine operation parameter of the semiconductor manufacturing process is defined as the second parameter input value, defining a parameter output value and setting a machine control parameter of the semiconductor manufacturing process to the parameter output value; and determining whether the machine control parameter of the semiconductor manufacturing process surpasses an acceptable range, wherein, when the machine control parameter of the semiconductor manufacturing process surpasses the acceptable range, repeating the above steps; otherwise utilizing the machine control parameter of the semiconductor manufacturing process for adjusting the machine.

2. The fuzzy control method for adjusting the semiconductor machine as claimed in claim 1, wherein the pre-semiconductor manufacturing process and the semiconductor manufacturing process are a wafer cleaning process, a photo process, a coating process, or an etching process.

3. The fuzzy control method for adjusting the semiconductor machine as claimed in claim 1, wherein the machine measurement parameter and the machine operation parameter are a wafer cleaning parameter, an exposure parameter, a coating parameter, or an etching parameter.

4. The fuzzy control method for adjusting the semiconductor machine as claimed in claim 1, wherein the machine adjusting level is a small adjusting level, a medium adjusting level, or a big adjusting level.

5. The fuzzy control method for adjusting the semiconductor machine as claimed in claim 1, wherein the fuzzy deciding operation comprises:

performing a fuzzy operation to define a first membership function value corresponding to the first and the second parameter input values and a second membership function value corresponding to the parameter output value;

building a fuzzy rule, wherein a condition set of the fuzzy rule is the first membership function value;

performing a deciding operation, wherein a result of the deciding operation is the second membership function value; and performing a de-fuzzy operation for the second membership function value.

6. The fuzzy control method for adjusting the semiconductor machine as claimed in claim 5, wherein the first membership function value and the second membership function value are a triangle-type membership function value.

7. The fuzzy control method for adjusting the semiconductor machine as claimed in claim 5, wherein the fuzzy rule is an IF-THEN type.

8. The fuzzy control method for adjusting the semiconductor machine as claimed in claim 5, wherein the fuzzy operation is an area method, a gravity center method, or a height method.

9. A fuzzy control method for adjusting a semiconductor machine, applied to a semiconductor machine in a semiconductor manufacturing process, the method comprising:

providing a machine measurement parameter of a pre-semiconductor manufacturing process, a machine measurement parameter of the semiconductor manufacturing process, and a machine operation parameter of the semiconductor manufacturing process;

determining a difference between the machine measurement parameter of the pre-semiconductor manufacturing process and the machine operation parameter, and determining another difference between the machine measurement parameter of the semiconductor manufacturing process and the machine operation parameter of the semiconductor manufacturing process;

selecting a machine adjusting level of the semiconductor manufacturing process;

performing a fuzzy operation on basis of the difference between the machine measurement parameter of the pre-semiconductor manufacturing process and the machine operation parameter of the semiconductor manufacturing process defined as a first parameter input value, and the difference between the machine measurement parameter of the semiconductor manufacturing process and the machine operation parameter of the semiconductor manufacturing process defined as a second parameter input value, defining a parameter output value, and defining a first membership function value corresponding to the first and the second parameter input values and a second membership function value corresponding to the parameter output value;

building establishing a fuzzy rule, wherein a condition set of the fuzzy rule is the first membership function value;

performing a deciding operation, wherein a result of the deciding operation is the second membership function value;

performing a de-fuzzy operation for the second membership function value to obtain a machine control parameter of the semiconductor manufacturing process; and determining whether the machine control parameter of the semiconductor manufacturing process surpasses an acceptable range, wherein, when the machine control parameter of the semiconductor manufacturing process surpasses the acceptable range, returning to the step of establishing the fuzzy rule;

otherwise utilizing the machine control parameter of the semiconductor manufacturing process for adjusting the machine.

10. The fuzzy control method for adjusting the semiconductor machine as claimed in claim 9, wherein the pre-semiconductor manufacturing process and the semiconductor manufacturing process are a wafer cleaning process, a photo process, a coating process, or an etching process.

11. The fuzzy control method for adjusting the semiconductor machine as claimed in claim 9, wherein the machine measurement parameter and the machine operation parameter are a wafer cleaning parameter, an exposure parameter, a coating parameter, or an etching parameter.

12. The fuzzy control method for adjusting the semiconductor machine as claimed in claim 9, wherein the machine adjusting level is a small adjusting level, a medium adjusting level, or a big adjusting level.

13. The fuzzy control method for adjusting the semiconductor machine as claimed in claim 9, wherein both the first membership function value and a second membership function value are a triangle-type membership function value.

14. The fuzzy control method for adjusting the semiconductor machine as claimed in claim 9, wherein the fuzzy rule is an IF-THEN type.

15. The fuzzy control method for adjusting the semiconductor machine as claimed in claim 9, wherein the fuzzy operation is an area method, a gravity center method, or a height method.

16. A fuzzy control method for adjusting a semiconductor machine, applied to a semiconductor machine in a semiconductor manufacturing process, the method comprising:
providing a machine measurement parameter of the semiconductor manufacturing process, and a machine operation parameter of the semiconductor manufacturing process;
determining a difference between the machine measurement parameter of the pre-semiconductor manufacturing process and the machine operation parameter, and determining another difference between the machine measurement parameter of the semiconductor manufacturing process and the machine operation parameter of the semiconductor manufacturing process;
executing a statistical operation, wherein the difference between the machine measurement parameter of the semiconductor manufacturing process and the machine operation parameter is defined as a first parameter input value, and the difference between the machine operation parameter of the semiconductor manufacturing process and the machine measurement parameter is defined as a second parameter input value;
executing a fuzzy deciding operation, wherein a parameter output value is defined, a machine control parameter of the semiconductor manufacturing process is calculated, and the machine control parameter is set to the parameter output value; and
determining whether the machine control parameter of the semiconductor manufacturing process surpasses an acceptable range, wherein, when the machine control parameter of the semiconductor manufacturing process surpasses the acceptable range, repeating the step of executing the fuzzy deciding operation; otherwise utilizing the machine control parameter of the semiconductor manufacturing process for adjusting the machine.

17. The fuzzy control method for adjusting the semiconductor machine as claimed in claim 16, wherein the machine measurement parameter and the machine operation parameter are a wafer cleaning parameter, an exposure parameter, a coating parameter, or an etching parameter.

18. The fuzzy control method for adjusting the semiconductor machine as claimed in claim 16, wherein the statistical operation comprises:
performing a fault detection and classification to classify the machine measurement parameter of the semiconductor manufacturing process to generate a related machine measurement parameter of the semiconductor manufacturing process, and to classify the machine operation parameter of the semiconductor manufacturing process to generate a related machine operation parameter of the semiconductor manufacturing process; and
performing a statistical weight for weighting the related machine measurement parameter of the semiconductor manufacturing process and for weighting the related machine operation parameter of the semiconductor manufacturing process to generate the first and the second parameter input values.

19. The fuzzy control method for adjusting the semiconductor machine as claimed in claim 16, wherein the fuzzy deciding operation comprises:
performing a fuzzy operation to define a first membership function value corresponding to the first and the second parameter input values and a second membership function value corresponding to the parameter output value;
building a fuzzy rule, wherein a condition set of the fuzzy rule is the first membership function value;
performing a deciding operation, a result of the deciding operation is the second membership function value; and
performing a de-fuzzy operation for the second membership function value.

20. The fuzzy control method for adjusting the semiconductor machine as claimed in claim 19, wherein the membership function value is a triangle-type membership function value.

21. The fuzzy control method for adjusting the semiconductor machine as claimed in claim 19, wherein the fuzzy rule is an IF-THEN type.

22. The fuzzy control method for adjusting the semiconductor machine as claimed in claim 19, wherein the fuzzy operation is an area method, a gravity center method, or a height method.

* * * * *